(12) United States Patent
Shin

(10) Patent No.: US 8,171,743 B2
(45) Date of Patent: May 8, 2012

(54) COOLING APPARATUS AND METHOD FOR LIQUID CRYSTAL DISPLAY DEVICE AND METHOD OF MANUFACTURING LIQUID CRYSTAL DISPLAY DEVICE

(75) Inventor: Jae-Ho Shin, Goyang-si (KR)

(73) Assignee: LG Display Co. Ltd., Seoul (KR)

( * ) Notice: Subject to any disclaimer, the term of this patent is extended or adjusted under 35 U.S.C. 154(b) by 490 days.

(21) Appl. No.: 12/331,055

(22) Filed: Dec. 9, 2008

(65) Prior Publication Data

US 2010/0077772 A1 Apr. 1, 2010

(30) Foreign Application Priority Data

Sep. 29, 2008 (KR) ........................ 10-2008-0095300

(51) Int. Cl.
*F25D 3/12* (2006.01)
(52) U.S. Cl. .......................................... 62/56; 62/259.2
(58) Field of Classification Search .......... 62/56, 259.2, 62/118, 314, 414, 419; 454/188, 233; 353/60, 353/122; 257/E21.002, 714; 438/30
See application file for complete search history.

(56) References Cited

U.S. PATENT DOCUMENTS

| | | | | |
|---|---|---|---|---|
| 4,904,079 A | * | 2/1990 | Yoshimura et al. | 353/122 |
| 5,828,572 A | * | 10/1998 | Hasegawa et al. | 700/117 |
| 6,484,512 B1 | * | 11/2002 | Anderson et al. | 62/3.2 |
| 2005/0110968 A1 | * | 5/2005 | Aichi et al. | 355/30 |
| 2005/0219471 A1 | * | 10/2005 | Kitabayashi | 353/54 |
| 2008/0134699 A1 | * | 6/2008 | Leaver et al. | 62/129 |

FOREIGN PATENT DOCUMENTS

| | | |
|---|---|---|
| JP | 2003195321 A | 7/2003 |
| KR | 20040083689 A | 10/2004 |
| TW | 487819 | 5/2002 |
| TW | 200825165 A | 6/2008 |
| TW | 200837311 A | 9/2008 |

OTHER PUBLICATIONS

Office Action issued in corresponding Taiwan Patent Application No. 97148622, mailed Jan. 31, 2011.

* cited by examiner

*Primary Examiner* — Mohammad Ali
(74) *Attorney, Agent, or Firm* — Brinks Hofer Gilson & Lione

(57) ABSTRACT

A cooling apparatus for a liquid crystal display device includes a cooling chamber; a stage in the cooling chamber, a liquid crystal cell placed on the stage; a plurality of cooling coils generating a cooled air; first and second fans blowing the cooled air on opposing plane surfaces of the liquid crystal cell; and a chiller supplying a refrigerant to the plurality of cooling coils.

16 Claims, 4 Drawing Sheets

COOLING APPARATUS AND METHOD FOR LIQUID CRYSTAL DISPLAY DEVICE AND METHOD OF MANUFACTURING LIQUID CRYSTAL DISPLAY DEVICE

RELATED APPLICATIONS

The present invention claims the benefit of Korean Patent Application No. 2008-0095300, filed in Korea on Sep. 29, 2008, which is hereby incorporated by reference for all purposes as if fully set forth herein.

BACKGROUND

1. Field of the Disclosure

The present invention relates to a cooling apparatus for a liquid crystal display device, and more particularly, to a cooling apparatus and method for a liquid crystal display device and a method of manufacturing a liquid crystal display device.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs) as a substitute for CRTs. Of these flat panel displays, LCD devices have many advantages such as high resolution, light weight, thin profile, compact size, and low voltage power supply requirements.

In general, an LCD device includes two substrates—an array substrate and a color filter substrate—that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

The LCD device is manufactured by manufacturing an array substrate which includes thin film transistors (TFTs) and pixel electrodes disposed of on respective pixel regions, manufacturing a color filter substrate which includes a black matrix, a color filter and a common electrode, and interposing a liquid crystal layer between the array substrate and the color filter substrate.

In interposing the liquid crystal layer, making a cell gap of the LCD device and forming a seal pattern may be performed. The seal pattern is hardened in a seal hardening furnace which includes a chamber heated at a predetermined temperature.

However, when the liquid crystal is exposed to the high temperature while hardening the seal pattern, alignment of the liquid crystal molecules is abnormally scattered. This scattering causes point defects at many pixel regions, and thus domain defects occur. To prevent this problem, after hardening the seal pattern, rapid cooling is performed to restore the scattered alignment of the liquid crystal molecules to an initial state. The rapid cooling is performed in a chamber of a cooling apparatus.

FIG. 1 is a view illustrating a cooling apparatus for an LCD device according to the related art.

Referring to FIG. 1, the cooling apparatus according to the related art includes a cooling chamber 10 and a chiller 20.

The cooling chamber 10 includes a stage 11 on which a liquid crystal cell 2 is placed, a cooling coil 13, a fan 15 and an air filter 17. The cooling coil 13 is supplied with air from an air supply line. The air supply line supplies air into the cooling chamber 10, and the cooling coil 13 cools the air. The air pan 15 circulates the cooled air in the cooling chamber 10, and the air filter 17 eliminates alien substances which may be included in the cooled air.

A process of cooling the liquid crystal cell 2 using the cooling chamber 10 is performed as follows. The liquid crystal cell 2 is placed on the stage 11, and then the air supplied from the air supply line is cooled through the cooling coil 13 to generate cooled air. Then, the cooled air is circulated in a direction shown as dashed arrows in FIG. 1 by the fan 15, and the liquid crystal cell 2 is thus cooled.

The cooling coil 13 cools the air using evaporation heat which is generated when a refrigerant using Freon gas is evaporated. However, since Freon gas is fatal, it is desired that the Freon gas is not supplied into the cooling chamber 10. Therefore, chiller 20 is equipped outside the cooling chamber 10.

Chiller 20 includes a refrigerant path 30 and a brine path 40. Along the refrigerant path 30, a compressor 31, a condenser 33 and an expansion valve 35 are equipped. Along the brine path 40, a brine tank 41, a brine pump 43, an evaporator 47 and a circulation pump 45 are equipped.

A high-temperature and high-pressure Freon gas outputted from the compressor 31 is condensed in the condenser 33 to be changed in phase into a high-pressure liquid refrigerant. Then, the condensed liquid refrigerant is expanded in the expansion valve 35 and changed into a low-temperature and low-pressure saturated refrigerant. The low-temperature and low-pressure saturated refrigerant is inputted into the evaporator 47, and at this time, a brine is inputted by the brine pump 43 from the brine tank 41 into the evaporator 47. The saturated refrigerant and the brine exchange their heats in the evaporator 47. The saturated refrigerant is evaporated in the evaporator 47, then inputted into the compressor 31, and then repeatedly circulated along the refrigerant path 30. The brine is inputted into the cooling coil 13 by the circulation pump 45, then inputted to the brine tank 41, and then repeatedly circulated along the brine path 40 and the cooling coil 13.

However, the cooling apparatus according to the related art has following problems. Freon gas destroys the ozone layer and its use is therefore restrained in order to protect the environment.

Moreover, brine path 40 is an additional structure equipped in order to prevent the Freon gas from flowing into the cooling chamber 10, thereby making the structure of the chiller 20 more complicated. Accordingly, an area occupied by the chiller 20 increases and production cost increases.

Moreover, since a cooling wind blows along a direction of one end side to an opposing end side of the liquid crystal cell 2, the cooling capability for the liquid crystal cell 2 is reduced.

BRIEF SUMMARY

Features and advantages of the present invention will be set forth in the description which follows, and in part will be apparent from the description, or may be learned by practice of the invention. These and other advantages of the invention will be realized and attained by the structure particularly pointed out in the written description and claims hereof as well as the appended drawings.

A cooling apparatus for a liquid crystal display device includes a cooling chamber; a stage in the cooling chamber, a liquid crystal cell placed on the stage; a plurality of cooling coils generating a cooled air; first and second fans blowing the cooled air on opposing plane surfaces of the liquid crystal cell; and a chiller supplying a refrigerant to the plurality of cooling coils.

In another aspect, a cooling method for a liquid crystal display device includes supplying a refrigerant from a chiller to a plurality of cooling coils of a cooling chamber; passing an air through the plurality of cooling coils to generate an cooled air; and blowing the cooled air on opposing plane surfaces of a liquid crystal cell through first and second fans.

In yet another aspect, a method of manufacturing a liquid crystal display device includes attaching first and second substrates using a seal pattern between peripheral regions of the first and second substrates to manufacture a liquid crystal cell, the liquid crystal cell including a liquid crystal between the first and second substrates; hardening the seal pattern at a predetermined temperature over a phase-transition temperature of the liquid crystal; and cooling the liquid crystal cell in a cooling chamber below the phase-transition temperature, cooling the liquid crystal cell including: supplying a refrigerant from a chiller to a plurality of cooling coils of a cooling chamber; passing an air through the plurality of cooling coils to generate an cooled air; and blowing the cooled air on opposing plane surfaces of the liquid crystal cell through first and second fans, wherein the phase-transition temperature is a temperature at which the liquid crystal is changed from a middle phase of solid and liquid to a liquid phase and becomes transparent.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to illustrated embodiments of the present invention, which are illustrated in the accompanying drawings.

Figure 1:
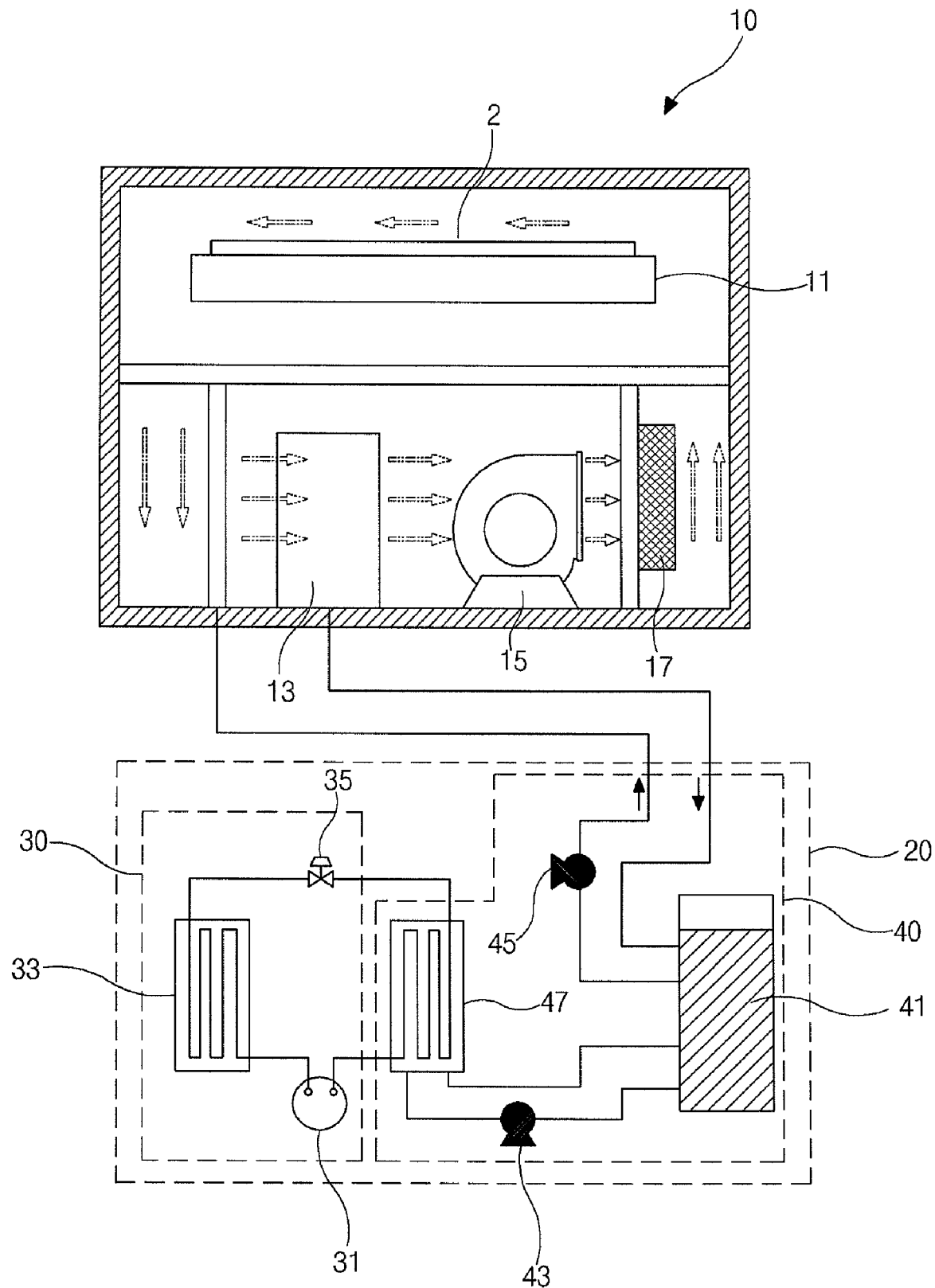
FIG. 1 is a view illustrating a cooling apparatus for an LCD device according to the related art.
Figure 2:
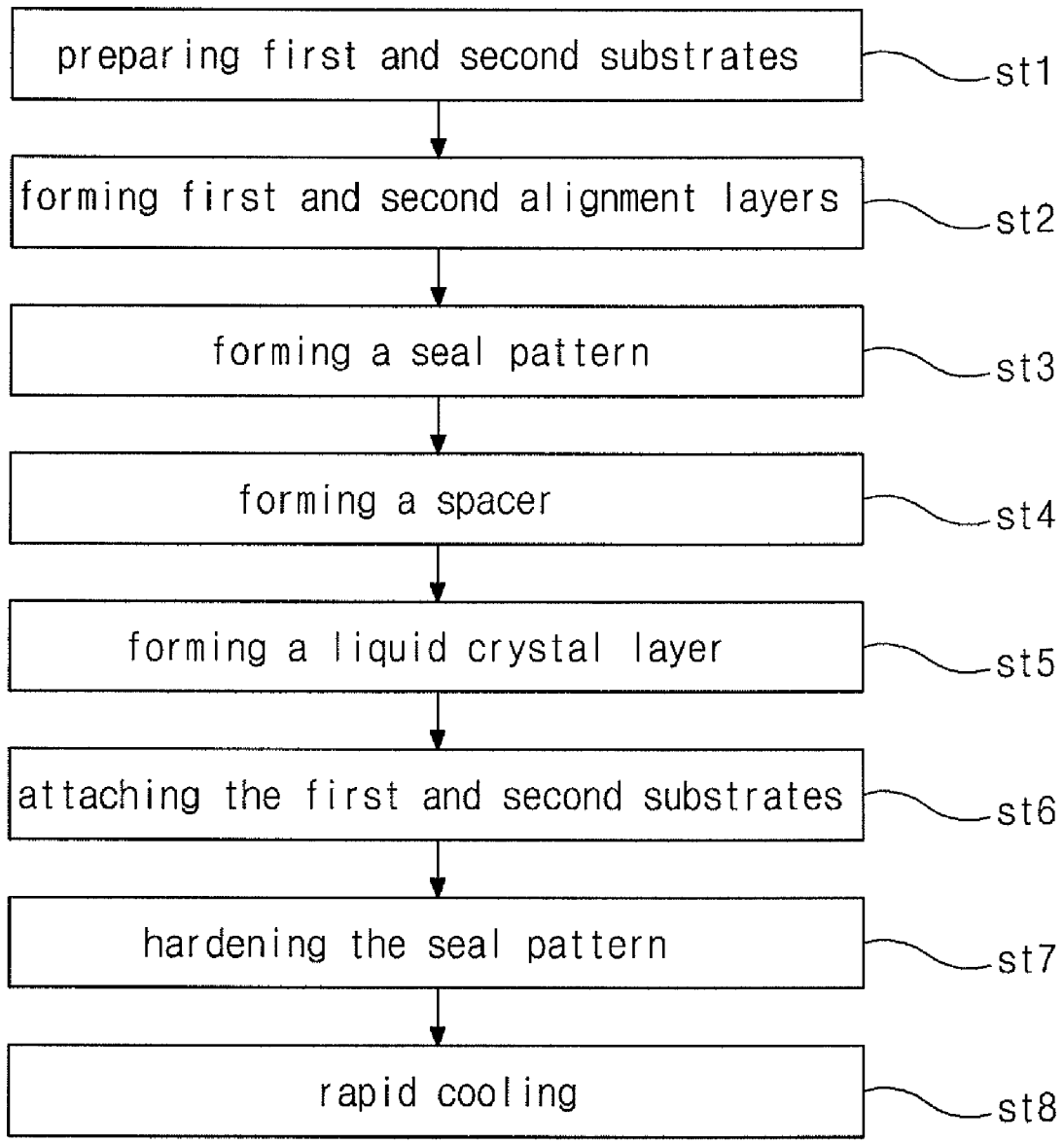
FIG. 2 is a flow chart illustrating a method of manufacturing an LCD device according to an embodiment of the present invention.

FIG. 2 is a flow chart illustrating a method of manufacturing an LCD device according to an embodiment of the present invention.

Referring to FIG. 2, in a first step st1, a first substrate for a color filter substrate and a second substrate for an array substrate are prepared. The second substrate may include a thin film transistor, which includes a gate electrode, a semiconductor layer and source and drain electrodes, and a pixel electrode in a pixel region. The first substrate may include a color filter layer in the pixel region, a black matrix between the pixel regions, and a common electrode on the color filter layer and the black matrix. Alternatively, the first and second substrates may have other structures. For example, at least one of the color filter and the black matrix is formed at the second substrate, or the common electrode is formed at the second substrate to induce an in-plane electric field with the pixel electrode.

In a second step st2, first and second alignment layers may be formed on inner surfaces of the first and second substrates, respectively. For example, the first and second alignment layers are coated, hardened, and rubbed. The first and second alignment layers may be made of polyimide.

In a third step st3, a seal pattern is formed. The seal pattern may be formed at a peripheral region of one of the first and second substrates. The seal pattern may be formed using a dispenser or a screen method. The seal pattern may be formed of a thermosetting resin or a UV-setting resin.

In a fourth step st4, a spacer is formed. The spacer maintains a cell gap between the first and second substrates. The spacer may be a ball spacer or column spacer. The spacer may be formed on one of the first and second substrates.

In a fifth step st5, a liquid crystal layer may be formed on one of the first and second substrates. For example, the liquid crystal is formed by a spray method or dispenser method.

In a sixth step st6, the first and second substrates are attached using the seal pattern to form a liquid crystal cell. The liquid crystal molecules are initially aligned according to rubbed directions of the first and second alignment layers.

In a seventh step st7, the seal pattern is hardened. For example, the seal pattern is placed in a seal hardening furnace including a chamber which is heated at a predetermined temperature. Accordingly, the first and second substrates are firmly attached by the hardened seal pattern. The seal pattern may be hardened in various manners according to types of the seal pattern. For example, the hardening of the seal pattern is performed by an UV exposure, a thermal hardening process, or an UV exposure and a thermal hardening process. The hardening process may be performed at about 120 degrees centigrade for about one hour. This high temperature condition may cause alignment of the liquid crystal molecules between the first and second substrates to be abnormally scattered.

In an eighth step st8, a rapid cooling is performed. The cooling can restore the scattered alignment of the liquid crystal molecules, which is caused by the hardening of the seal pattern, to an initial state. Accordingly, point defects and domain defects can be prevented.

After the eighth step st8, some processes such as a cutting process and an inspection process may be performed, then a driving circuit is connected to the liquid crystal cell, and then polarizing plates and other components are assembled with the liquid crystal cell. Through the aforementioned processes, an LCD device is manufactured.

The eight step st8 may be performed in a cooling apparatus. For example, the liquid crystal cell after the seventh step 7 is placed in a cooling chamber of the cooling apparatus, and a temperature of the cooling chamber decreases to about negative (−) 2 degrees to negative (−) 5 degrees centigrade.

Figure 3:
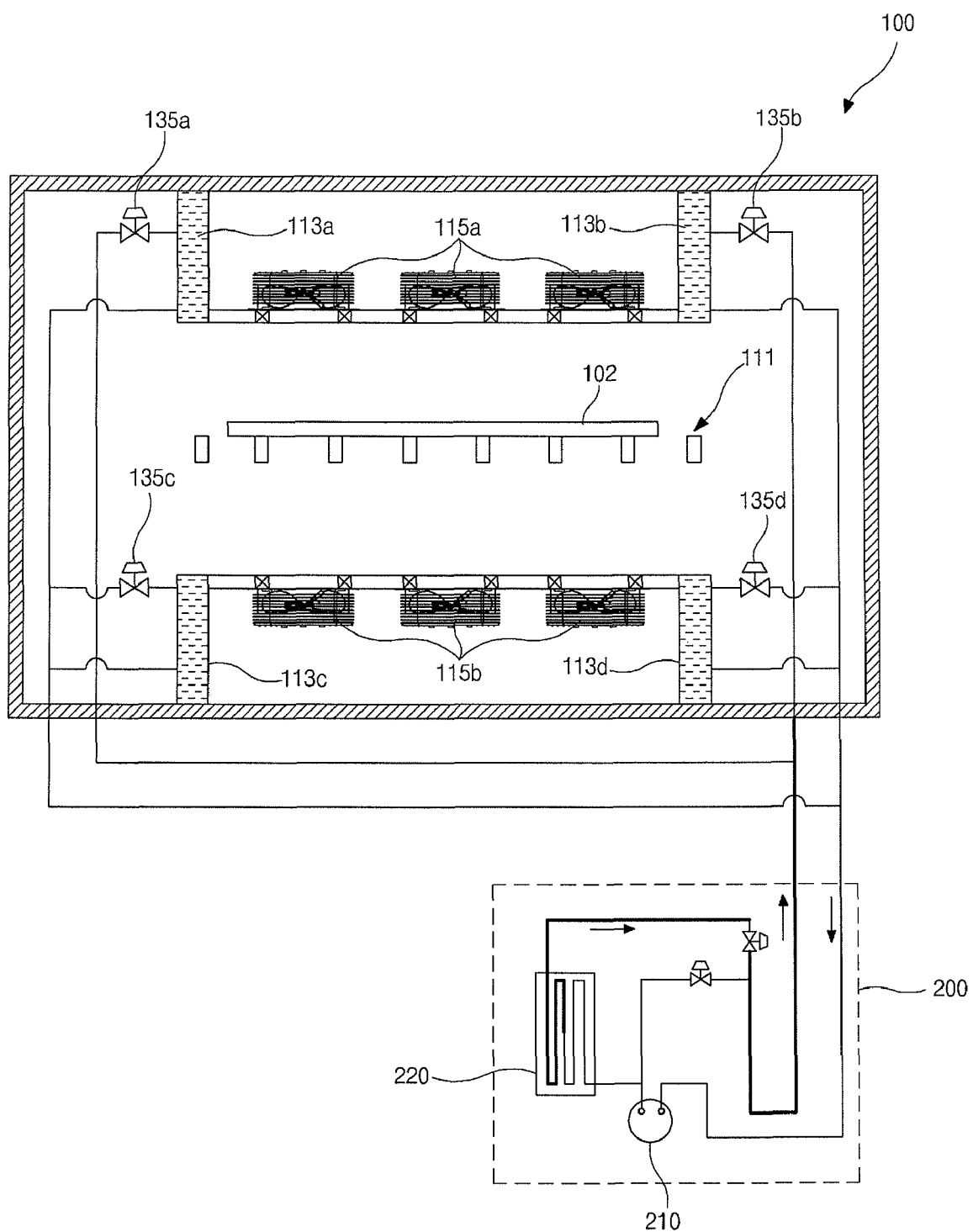
FIG. 3 is a conceptual view illustrating a cooling apparatus according to an embodiment of the present invention.

FIG. 3 is a conceptual view illustrating a cooling apparatus according to an embodiment of the present invention.

Referring to FIG. 3, the cooling apparatus may include a cooling chamber 100 and a chiller 200.

The cooling chamber 100 may include a stage 111 on which a liquid crystal cell 102 is placed; cooling coils 113a, 113b, 113c and 113d; fans 115a and 115b; and expansion valves 135a, 135b, 135c and 135d. An air supply line directs air into the chamber 100, and the cooling coils 113a to 113d cool the air. Fans 115a and 115b blows the cooled air to the liquid crystal cell 102.

The cooling coils 113a to 113d cool the air using evaporation heat, which is generated when a refrigerant is evaporated. The refrigerant may be at least one of environmentally friendly gases, for example, R404A, R407C, R410A, R507, and R134A. The refrigerant gases, R404A, R407C, R410A, R507 and R134A are recently developed and are substitutes for the Freon gas. These substitute gases are harmless to a human being and do not affect the ozone layer and the global warming phenomenon. Accordingly, the refrigerant is inputted into the cooling coils 113a to 113d, the refrigerant and the air from the air supply line exchange heat, and the cooled air is thus generated.

The cooled air is blown on the liquid crystal cell 102 through fans 115a and 115b. The fans 115a and 115b may be axial fans which are capable of inhaling the cooled air from the back portion of the fans 115a and 115b and blowing the cooled air toward the front portion of the fans 115a and 115b. The front portion of the fans 115a and 115b face the liquid crystal cell 102.

The fans 115a and 115b may include at least one first fan 115a disposed of at a top portion of the cooling chamber 100 and at least one second fan 115b disposed of at a bottom portion of the cooling chamber 100. For example, the liquid crystal cell 102 is located between the first fan 115a and the second fan 115b. While the front portion of the first fan 115a faces one of opposing plane surfaces of the liquid crystal cell 102, the front portion of the second fan 115b faces the other of the opposing plane surfaces of the liquid crystal cell 102. Accordingly, the first and second fans 115a and 115b blow the cooled airs in opposite direction.

The stage 111 may have an open portion exposing a bottom surface of the liquid crystal cell 102 placed on the stage 111, so that the cooled air from the second fan 115b is blown on the bottom surface of the liquid crystal cell 102.

Since the first and second fans 115a and 115b directly blow the cooled air on the opposing surfaces of the liquid crystal cell 102, cooling capability can be improved compared to the cooling capability of the cooling apparatus according to the related art.

The cooling coils 113a to 113d may include first to fourth cooling coils 113a to 113d. The first and second cooling coils 113a and 113b are disposed of at the top portion of the cooling chamber 100 and at both sides of the first fan 115a. The third and fourth cooling coils 113c and 113d are disposed of at the bottom portion of the cooling chamber 100 and at both sides of the second fan 115b. The first to fourth cooling coils 113a to 113d cool the air supplied from the air supply line so that the cooled air is generated.

The cooled air generated by the first and second cooling coils 113a and 113b is supplied to the back portion of the first fan 115a. The cooled air generated by the third and fourth cooling coils 113c and 113d is supplied to the back portion of the second fan 115b.

The expansion valves 135a to 135d may include first to fourth expansion valves 135a to 135d. The first to fourth expansion valves 135a to 135d are coupled with the first to fourth cooling coils 113a to 113d, respectively, so that an evaporated saturated refrigerant is directly inputted to the cooling coils 113a to 113d.

The refrigerant is supplied from the chiller 200 to the cooling chamber 100. The chiller 200 may include a compressor 210 and a condenser 220.

A high-temperature and high-pressure gas refrigerant outputted from the compressor 210 is condensed in the condenser 220 and changed in phase into a high-pressure liquid refrigerant. Then, the condensed refrigerant is supplied into the chamber 100, expanded in the first to fourth expansion valves 135a to 135d, and changed into a low-temperature and low-pressure saturated refrigerant. Then, the saturated refrigerant comes out of the chamber 100 and returns to the compressor 210, and then is repeatedly circulated along the aforementioned refrigerant path.

Figure 4:
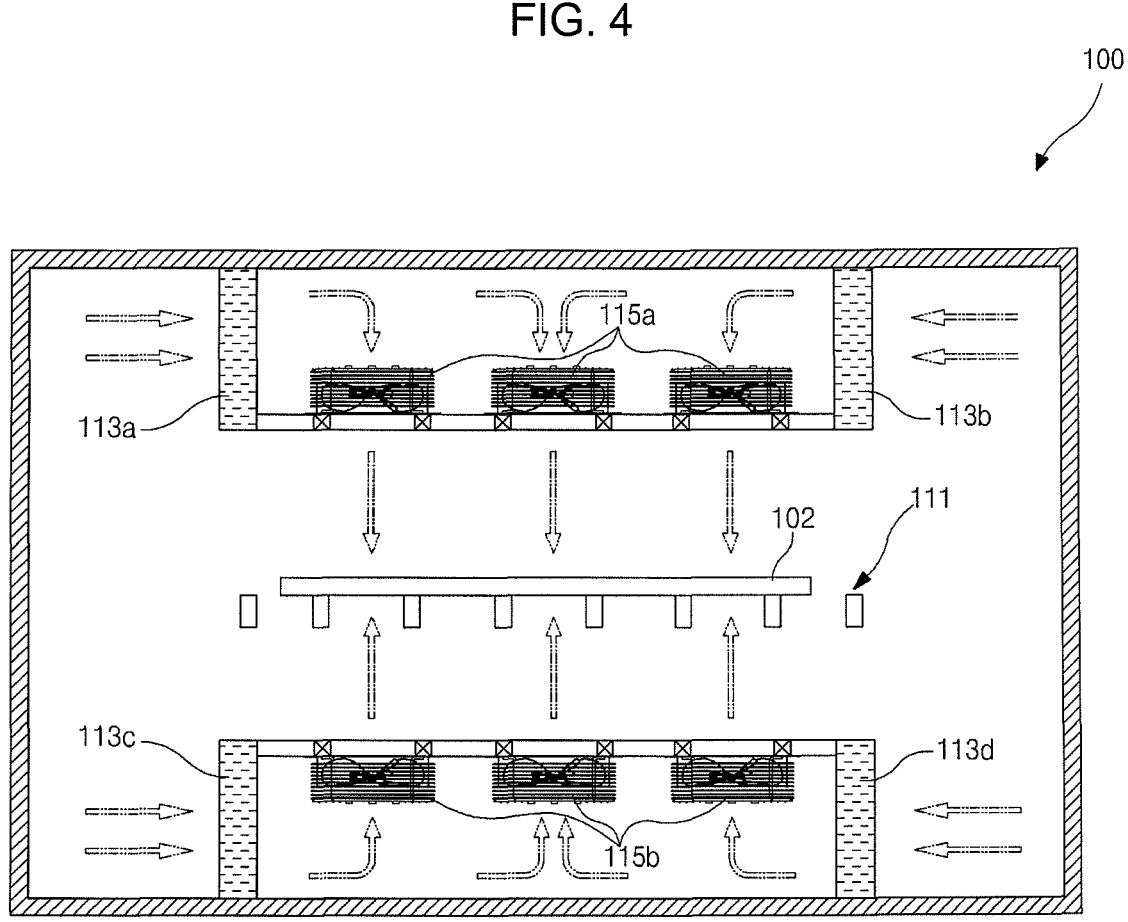
FIG. 4 is a conceptual view illustrating cooling method for a liquid crystal cell according to the embodiment of the present invention.

FIG. 4 is a conceptual view illustrating cooling method for a liquid crystal cell according to an embodiment of the present invention.

Referring to FIG. 4, the low-temperature and low-pressure saturated refrigerant is supplied to the first to fourth cooling coils 113a to 113d. When the liquid crystal cell 102 is placed on the stage 111, the air supplied from the air supply line passes through the first to fourth cooling coils 113a to 113d and is cooled. The cooled air is supplied to the back portions of the first and second fans 115a and 115b and is blown on the opposing plane surfaces of the liquid crystal cell 102 while the first and second fans 115a and 115b operate. Accordingly, the liquid crystal cell 102 is rapidly cooled, and an abnormal alignment of the liquid crystal molecules in the liquid crystal cell 102 can be restored to a normal alignment.

Through the cooling process, a temperature of the liquid crystal may fall below a phase-transition temperature Tni of the liquid crystal for about 30 seconds. The phase-transition temperature is a temperature at which the liquid crystal is changed from a middle phase of solid and liquid to a liquid phase and becomes transparent. The phase-transition temperature is generally about 60 degrees to about 90 degrees centigrade. Accordingly, it is preferred that a temperature in the cooling chamber 100 decreases to about negative (−) 2 degrees to about negative (−) 5 degrees centigrade.

In more detail, the temperature of the liquid crystal cell 102 after hardening the seal pattern (st7 of FIG. 2) is about 120 degrees centigrade. The temperature of the liquid crystal cell 102 falls by about 10 degrees while the liquid crystal cell 102 moves into the cooling chamber 100, and therefore the temperature of the liquid crystal cell 102 when placed in the cooling chamber 100 becomes 110 degrees centigrade. In order to lower the temperature of the liquid crystal cell 120 to or below the phase-transition temperature, about 60 degrees to about 90 degrees centigrade, the temperature in the cooling chamber 100 rapidly falls to about negative (−) 2 degrees to about negative (−) 5 degrees centigrade.

The cooling chamber 100 may further include an air filter, eliminating alien substances which may be included in the cooled air.

As described above, the cooling apparatus rapidly cools the liquid crystal cell using the refrigerant such as R404A, R407C, R410A, R507 and R134A which are harmless and are environmentally friendly.

Moreover, since the refrigerant is directly inputted into the cooling chamber, the brine path of the cooling apparatus according to the related art can be eliminated. Accordingly, the chiller can have a simple structure, the area occupied by the chiller can be reduced, and the production cost can thus be reduced. In addition, problems of the related art due to the use of the brine path—for example, corrosion of the brine pump and the circulation pump because of high density of the brine—can be removed.

Moreover, since the refrigerant is directly supplied to the cooling chamber, rapid cooling of the liquid crystal cell can be performed more effectively than that of the related art where the Freon gas and the brine exchange heat and the brine is supplied to the cooling chamber.

Moreover, since the first and second fans directly blow the cooled air on the opposing plane surfaces of the liquid crystal cell, the liquid crystal cell can be rapidly cooled. In other words, the cooling capability can be improved compared to the cooling capability of the related art where the cooled air flows from the one end side to the opposing end side of the liquid crystal cell.

The cooling apparatus according to an embodiment of the present invention can be applied to electronic devices and display devices which need cooling. For example, substrates and panels for the display devices can be cooled by the cooling apparatus of an embodiment of the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A cooling apparatus for a liquid crystal display device, comprising:
   a cooling chamber;
   a stage in the cooling chamber, a liquid crystal cell placed on the stage;
   a plurality of cooling coils generating a cooled air;
   first and second fans blowing the cooled air perpendicularly on opposing plane surfaces of the liquid crystal cell; and
   a chiller supplying a refrigerant to the plurality of cooling coils,
   wherein the cooled air cools the liquid crystal cell below a phase-transition temperature of a liquid crystal of the liquid crystal cell, and wherein the phase-transition temperature is a temperature at which the liquid crystal is changed from a middle phase of solid and liquid to a liquid phase and becomes transparent.

2. The apparatus according to claim 1, wherein the refrigerant is at least one of R404A, R407C, R410A, R507 and R134A gases.

3. The apparatus according to claim 1, wherein the first and second fans face each other with the liquid crystal cell therebetween.

4. The apparatus according to claim 1, wherein the plurality of cooling coils includes first to fourth cooling coils, wherein the first and second cooling coils are at both sides of the first fan, respectively, to supply the cooled air to a back of the first fan, and wherein the third and fourth cooling coils are at both ends of the second fan, respectively, to supply the cooled air to a back of the second fan.

5. The apparatus according to claim 1, further comprising a gas supply line supplying an air to the plurality of cooling coils to generate the cooled air.

6. The apparatus according to claim 1, further comprising a plurality of expansion valves coupled with the plurality of cooling coils, respectively, and wherein the expansion valve expands the refrigerant and supplies the expanded refrigerant to the cooling coil.

7. The apparatus according to claim 6, wherein the chiller includes a compressor compressing the refrigerant and a condenser condensing the compressed refrigerant, and wherein the condensed refrigerant is supplied to the plurality of expansion valves.

8. A cooling method for a liquid crystal display device, comprising:
   supplying a refrigerant from a chiller to a plurality of cooling coils of a cooling chamber;
   passing an air through the plurality of cooling coils to generate an cooled air; and
   blowing the cooled air on perpendicularly opposing plane surfaces of a liquid crystal cell through first and second fans,
   wherein the cooled air cools the liquid crystal cell below a phase-transition temperature of a liquid crystal of the liquid crystal cell, and wherein the phase-transition temperature is a temperature at which the liquid crystal is changed from a middle phase of solid and liquid to a liquid phase and becomes transparent.

9. The method according to claim 8, wherein supplying the refrigerant from the chiller to the plurality of cooling coils includes:
   compressing the refrigerant in a compressor of the chiller;
   condensing the compressed refrigerant in a condenser of the chiller;
   expanding the condensed refrigerant in a plurality of expansion valves of the cooling chamber; and
   supplying the expanded refrigerant to the plurality of cooling coils.

10. The method according to claim 8, wherein the refrigerant is at least one of R404A, R407C, R410A, R507 and R134A gases.

11. The method according to claim 8, wherein the first and second fans face each other with the liquid crystal cell therebetween.

12. A method of manufacturing a liquid crystal display device, comprising:
   attaching first and second substrates using a seal pattern between peripheral regions of the first and second substrates to manufacture a liquid crystal cell, the liquid crystal cell including a liquid crystal between the first and second substrates;
   hardening the seal pattern at a predetermined temperature over a phase-transition temperature of the liquid crystal; and
   cooling the liquid crystal cell in a cooling chamber below the phase-transition temperature, cooling the liquid crystal cell including:
   supplying a refrigerant from a chiller to a plurality of cooling coils of a cooling chamber;
   passing an air through the plurality of cooling coils to generate an cooled air; and
   blowing the cooled air on opposing plane surfaces of the liquid crystal cell through first and second fans,
   wherein the phase-transition temperature is a temperature at which the liquid crystal is changed from a middle phase of solid and liquid to a liquid phase and becomes transparent.

13. The method according to claim 12, wherein supplying the refrigerant from the chiller to the plurality of cooling coils includes:
   compressing the refrigerant in a compressor of the chiller;
   condensing the compressed refrigerant in a condenser of the chiller;
   expanding the condensed refrigerant in a plurality of expansion valves of the cooling chamber; and
   supplying the expanded refrigerant to the plurality of cooling coils.

14. The method according to claim 12, wherein the cooled air decreases a temperature of the cooling chamber to about negative 2 degrees to about negative 5 degrees centigrade.

15. The method according to claim 12, wherein the refrigerant is at least one of R404A, R407C, R410A, R507 and R134A gases.

16. The method according to claim 12, wherein the first and second fans face each other with the liquid crystal cell therebetween.

* * * * *